(12) United States Patent
Cheng (10) Patent No.: US 9,719,643 B1
(45) Date of Patent: Aug. 1, 2017

(54) SYSTEM FOR RESEMBLING AN OPEN CANDLE FLAME

(71) Applicant: Universal Candle Company Limited, Hong Kong (HK)

(72) Inventor: Chak-yin Cheng, Hong Kong (HK)

(73) Assignee: Universal Candle Company Limited, Hong Kong (HK)

( * ) Notice: Subject to any disclaimer, the term of this patent is extended or adjusted under 35 U.S.C. 154(b) by 0 days.

(21) Appl. No.: 15/387,140

(22) Filed: Dec. 21, 2016

Related U.S. Application Data

(60) Provisional application No. 62/343,143, filed on May 31, 2016.

(51) Int. Cl.
| | |
|---|---|
| *F21V 5/00* | (2015.01) |
| *F23D 3/16* | (2006.01) |
| *F21S 10/04* | (2006.01) |
| *F21L 4/02* | (2006.01) |
| *F21S 6/00* | (2006.01) |

(Continued)

(52) U.S. Cl.
CPC ............... *F21S 10/043* (2013.01); *F21L 4/02* (2013.01); *F21S 6/001* (2013.01); *F21S 10/046* (2013.01); *F21V 14/02* (2013.01); *F21V 14/06* (2013.01); *G02B 1/041* (2013.01); *G02B 1/045* (2013.01); *G02B 6/0006* (2013.01); *G02B 6/0008* (2013.01); *H05B 33/0845* (2013.01);

(Continued)

(58) Field of Classification Search
CPC ........ F21S 10/043; F21S 6/001; F21S 10/046; F21L 4/02; G02B 1/041; G02B 1/045; G02B 6/0006; G02B 6/0008; F21V 14/02; F21V 14/06; H05B 33/0845; H05B 33/0887; F21Y 2115/10; F21W 2121/00
USPC ................................. 362/555, 569, 392, 161
See application file for complete search history.

(56) References Cited

U.S. PATENT DOCUMENTS

| 3,237,053 A | 2/1966 | Kyp |
| 5,924,784 A | 7/1999 | Chliwnyj et al. |

(Continued)

FOREIGN PATENT DOCUMENTS

| CN | 101865413 A | 10/2010 |
| CN | 102434843 A | 5/2012 |

(Continued)

*Primary Examiner* — Andrew Coughlin
*Assistant Examiner* — Glenn Zimmerman
(74) *Attorney, Agent, or Firm* — Spruson & Ferguson (Hong Kong) Limited (57) ABSTRACT

A system simulating an open candle flame is provided in the present invention. In a preferred embodiment, the present system comprises a gyro-levitation unit including two spinning wheels with axes mutually perpendicular to each other to allow a two-degree of rotational freedom resembling the open candle flame motion caused by air flow in its surrounding environment. A mechatronics based actuator made of a bi-metal is employed to disturb the equilibrium of the gyroscope by exerting an actuating force against the gyro-levitation unit. Electric current controlled by a dedicated electronic unit flowing through the actuator allows reciprocal linear motion aligned with the visible light pattern of the candle flame. Varying light intensity of the candle flame is obtained as a combination of two light sources with one transmitted to a flame display through an optical device by total internal reflection and another one by projecting on its sideway.

8 Claims, 6 Drawing Sheets

(51) Int. Cl.
*G02B 1/04* (2006.01)
*F21V 8/00* (2006.01)
*F21V 14/02* (2006.01)
*F21V 14/06* (2006.01)
*H05B 33/08* (2006.01)
*F21W 121/00* (2006.01)
*F21Y 115/10* (2016.01)

(52) U.S. Cl.
CPC ..... *H05B 33/0887* (2013.01); *F21W 2121/00* (2013.01); *F21Y 2115/10* (2016.08)

(56) References Cited

U.S. PATENT DOCUMENTS

| | | | |
|---|---|---|---|
| 6,616,308 B2 | 9/2003 | Jensen et al. | |
| 7,029,146 B2 | 4/2006 | Kitchen | |
| 7,201,500 B2 | 4/2007 | Mishan | |
| 7,837,355 B2 | 11/2010 | Schnuckle et al. | |
| 8,070,319 B2 | 12/2011 | Schnuckle et al. | |
| 8,342,712 B2 | 1/2013 | Patton et al. | |
| 8,534,869 B2 | 9/2013 | Patton et al. | |
| 8,550,660 B2 | 10/2013 | Patton et al. | |
| 8,602,632 B1 | 12/2013 | Poon | |
| 8,646,946 B2 | 2/2014 | Schnuckle et al. | |
| 8,696,166 B2 | 4/2014 | Patton et al. | |
| 8,721,118 B2 | 5/2014 | Patton et al. | |
| 8,727,569 B2 | 5/2014 | Schnuckle et al. | |
| 8,733,986 B2 | 5/2014 | Hau et al. | |
| 8,789,986 B2 | 7/2014 | Li | |
| 2006/0034100 A1* | 2/2006 | Schnuckle | B44C 5/06 362/161 |
| 2009/0313866 A1 | 12/2009 | Wang | |
| 2010/0254155 A1 | 10/2010 | Capo et al. | |
| 2011/0058363 A1 | 3/2011 | Fattizzi | |
| 2016/0053954 A1 | 2/2016 | Lai | |

FOREIGN PATENT DOCUMENTS

| | | |
|---|---|---|
| CN | 202442258 U | 9/2012 |
| CN | 202647570 U | 1/2013 |
| CN | 202691886 U | 1/2013 |
| CN | 203036543 U | 7/2013 |
| CN | 203363973 U | 12/2013 |
| CN | 203442498 U | 2/2014 |
| CN | 203595071 U | 5/2014 |
| CN | 203642063 U | 6/2014 |
| CN | 103343939 B | 2/2015 |
| CN | 105008794 A | 10/2015 |
| CN | 105026829 A | 11/2015 |
| EP | 3001100 A1 | 3/2016 |
| WO | 2012000418 A1 | 1/2012 |
| WO | 2014120973 A1 | 8/2014 |
| WO | 2016015390 A1 | 2/2016 |
| WO | 2016029334 A1 | 3/2016 |

\* cited by examiner

SYSTEM FOR RESEMBLING AN OPEN CANDLE FLAME

FIELD OF THE INVENTION

The present invention relates, in general, to methods and systems for simulating an open candle flame capable to incorporate user specific desires. In particular, the present invention relates to methods and systems for simulating visible light pattern and associated motion of an open candle flame with an aid of an integral structural design comprising electronic and mechanical control units incorporated therein to simulate the flame, and optical means for guiding light from at least one light source to a flame display.

BACKGROUND OF THE INVENTION

An open candle flame observes the basic physics in which its flame is seen as the visible, gaseous part of a fire. It is caused by a highly exothermic reaction taking place in a thin zone. When the candle is lighted, the fuel molecules in the candle wax are allowed to vaporize. At that state, they can then readily react with oxygen in the air, which gives off enough heat in the subsequent exothermic reaction to vaporize yet more fuel, thus sustaining a consistent flame. Sufficient energy in the flame will excite the electrons in some of the transient reaction intermediates which results in the emission of visible light as these substances release their excess energy. The chemical kinetics occurring in the flame is very complex and involves typically a large number of chemical reactions and intermediate species, most of them are radicals.

The challenge of the open candle flame simulation lies on the fidelity to resemble the subtle concept that candles burning with different flames have many different meanings and functions. The way that a candle burns can hold hidden significance as they can shine bright or glow dull in different situations like ceremonial, ritualistic, symbolic and utilitarian or all at the same time.

There have been some similar simulated candles in the technical field. For example, in U.S. Pat. No. 6,616,308, an imitation candle apparatus made from translucent material like paraffin having light transmissive properties is provided. Said imitation candle apparatus comprises a light diffusing body having permanent exterior surfaces including an upper surface with a depressed center section which appears reduced by melting, a cavity within the light diffusing body, and a small high density light source within the cavity to illuminate from below the bottom of the depressed center section more brightly than the other surfaces of the light diffusing body. It may have a light-sensing function which can turn the light off during day time and a flicker circuit which enables three to four distinct light levels that vary in a pseudo-random manner in order to provide a realistic variation of light output akin to a candle flame being disturbed by gentle air currents. Because the light source body of this patent is placed near the surface in the cavity and is from a small area, the light source is required to be super bright such that the light can be diffused throughout the body of the candle. It also can only vary the brightness level of the light source by varying the current to the LED under one or more low frequency oscillators. However, the light pattern of a candle flame cannot be simulated by that apparatus.

In U.S. Pat. No. 7,837,355, an apparatus creating flickering flame effect is provided including a housing incorporated with a time varying electromagnetic field driven mechanism to drive a first pendulum member with magnets on both ends in order to interact with the mechanism to generate a first pendulum movement followed by interacting with a second pendulum member having a magnet in order to generate a magnetic coupling effect on a flame silhouette extended from the second pendulum member. A light source is adapted to transmit light to the flame silhouette. The direction, magnitude, and frequency of the movement of the first and second pendulum members is limited by various factors including gravity, the magnitude and frequency of the time varying electromagnetic field for driving the mechanism, orientation of the magnet(s) on the first and second pendulum members, the mass, shape and size of the first and second pendulum members, any additional element intervening the movement of the pendulum, air resistance acting on the motion of the pendulum, etc. To drive the movement of the flame silhouette, that apparatus requires complex interactions between the drive mechanism, two pendulums, and any other intervening element, which makes it complicated in manufacturing and in operation.

In U.S. Pat. No. 8,070,319, which is under a continuation-in-part application of U.S. Pat. No. 7,837,355, it was further provided a single stage embodiment with one pendulum member, and an embodiment of a two-stage housing with a housing-contained lighting assembly and sidewall magnets for shaping and effecting movement of the flame body or the second pendulum member. According to one implementation method of the single stage embodiment, it was provided that there can be one or more than one light sources that may be aligned with each other. When the flame silhouette moves in normal operation with the connected pendulum member, its angle with respect to the light source(s) and the intensity of the reflected light changes continuously and in a complex, kinetic manner. In the two-stage embodiment, it was provided that the housing-contained lighting assembly can provide a beam of light about the size/shape of spot on the flame silhouette. It was also provided that the sidewall magnets are configured to provide a second kinetic movement to the upper pendulum member, in addition to the kinetic movement due to the interaction with the lower or first pendulum member resulted from the time-varying magnetic filed driven mechanism. The sidewall magnets can be modified in terms of the number of magnets, their position in the housing with respect to the upper pendulum member, their shape, etc., in order to result in a static magnetic field that interacts with the dynamic magnetic field to result in the desired movement of the flame body. The additional lighting assembly and sidewall magnets in the two-stage embodiment of this patent may provide enhanced lighting effect and motion patterns more resembling to an actual open flame, but still the problems are limited by the factors that are inherent from the magnetic field driven mechanism of the original design. The new embodiments in this patent are still complex in structure, leading to complications in manufacturing and operation.

In U.S. Pat. No. 8,342,712, which is a continuation-in-part application of U.S. Pat. No. 8,070,319, it was further provided a light engine controller to control at least two lighting devices/assemblies which provide light on opposite sides of the flame silhouette or on the same side thereof. The at least two lighting devices/assemblies can provide the same or different colors of light or can be monochromatic or multi-color light source. The light engine controller can control brightness or intensity of light from the lighting devices/assemblies and provide driving or control signals. The controller may include a processor and a power supply, wherein the processor may manage a memory containing flame lighting program that is executable by the processor to cause the processor to transmit control signals for driving or operating the various effects of the light source from the lighting devices/assemblies. The simulation algorithm(s) of the program according to different embodiments of this patent appear to be more focused on varying the brightness/intensity of the two lighting devices/assemblies in order to result in the desired coloring effect over time. Although the controller is said to be replaceable by manual controls, it appears that either the program pre-installed in the controller or manual controls is not capable to provide a corresponding visible light pattern to align with a reciprocal motion of the flame body with respect to air current flowing through the flame body. In other words, there is no correlation between the changing coloring effect and the motion of the flame body in this series of US patents.

Therefore, there is an unmet need in the art for a flameless candle resembling a burning candle with different flame patterns by sensing and responding to the change of the air current of its surroundings.

SUMMARY OF THE INVENTION

Accordingly, one objective of the present invention is to replicate visible light pattern and associated motion of an open candle flame by a flameless candle system with an integral structural design comprising electronic and mechanical units incorporated therein to simulate the open candle flame, and an optical means for guiding at least one light source to a flame display. There are two implementation embodiments provided in the present invention.

In the first implementation embodiment, the system of the present invention comprises a holder for housing a gyro-levitation structure, a mechatronics based actuator, a first light source, an optical device for guiding light from a second light source, and a weight; a base for housing a processor, a power supply and said second light source. The gyro-levitation structure comprises two spinning wheels with orthogonal axis of rotation, where each of them has one axis of rotation which is free to assume any orientation by itself. In an embodiment, the gyro-levitation structure comprises an outer gimbal and an inner gimbal with pivotal axes which are mutually perpendicular to each other. The outer gimbal is mounted on the holder to pivot about an axis in its own plane and possesses one degree of rotational freedom. The inner gimbal is mounted in the outer gimbal of the gyro-levitation structure so as to pivot about an axis in its own plane that is perpendicular to the pivotal axis of the outer gimbal, and possesses two degrees of rotational freedom resembling an open candle flame motion in open space.

In the first implementation embodiment of the present invention, the gyro-levitation structure is configured as a frame to drive the movement of a candle flame shape sheet or membrane or display for displaying the simulated flame pattern generated directly by one of the two light sources or indirectly from the guided light source from the optical device or a combination thereof. The candle flame display is connected to said optical device at one end while the other end of said optical device is a receiving end of the light from the second light source which is positioned on the base where the processor and the power supply are housed. The receiving end of the light from the second light source comprises a convex lens for generating a more focused light to be transmitted through the optical device. In the preferred embodiment, the optical device includes a light guide made of optical grade material such as acrylic resin, polycarbonate, epoxies, and/or other optical lighting materials. In other embodiment, the first and second light sources are light-emitting diode (LED) varying in size, shape, color and brightness. Variation in brightness of the first and/or second light sources can be controlled digitally by using Pulse Width Modulation (PWM). Preferably, the brightness of the first and/or second light sources is varied by using a controlled signal generator built in said processor. The first light source is preferably mounted on an interior sidewall of the holder to provide light from sideway of the flame display while the second light source is positioned on the base to provide an upward light signal through total internal reflection inside the light guide to the flame body. In the first implementation embodiment, the mechatronics based actuator is configured to provide a dynamic motion to the flame body by disturbing the equilibrium of the gyro-levitation structure. In the preferred embodiment, the mechatronics based actuator is in a wire form and both ends are mounted on the sidewall of the holder in opposite position to each other as pivots. The mechatronics based actuator is made of a bi-metal material capable to contract and expand when temperature is changed. One of the suitable candidates for said bi-metal material is nickel-titanium alloy built in a wire form and in combination of different crystal structures of nickel and titanium. In a sample size of 0.076 mm diameter wire, it is capable to be shortened in length by about 5% in 1 s for a let-through current of 200 mA. It is capable to return to its original length after the electric current is cut off for allowing its temperature to cool down. By using the bi-metal material as such to make the mechatronics based actuator and applying an on-off duty cycle type of electric current to the actuator, the length of the wire-like structure can vary in order to disturb the equilibrium of the gyro-levitation structure. The degree and frequency of the actuating force exerted by the mechatronics based actuator may depend on the oscillation frequency and magnitude of the electric current applied to the mechatronics based actuator. To provide such on-off duty cycle type of electric current, the processor comprises a controlled signal generator so as to manipulate the on-off duty cycle of the electric current generated by the power source to the mechatronics based actuator. In a preferred embodiment, the random number generator for controlling the on-off duty cycle of the electric current to the mechatronics based actuator is the same generator for digitally controlling the brightness of the first and/or second light sources. In other words, the electric current flowing through the mechatronics based actuator allows reciprocal linear motion which is aligned with the visible light pattern displayed on the flame body managed by the same signal generator of the processor. In other embodiment, the signal generator for controlling the on-off duty cycle of the electric current to the mechatronics based actuator is different from that for digitally controlling the brightness of the first and/or second light sources. In the first implementation embodiment, the mechatronics based actuator is positioned beneath the weight which is close to the end of the optical device where the light from the second light source is received.

In the second implementation embodiment of the present invention, the system comprises the same electronic and mechanical components as in the first implementation embodiment except that the gyro-levitation structure is absent. Another structural difference is that the mechatronics based actuator's position in the holder according to the second implementation embodiment is relatively higher than that according to the first implementation embodiment, with respect to the base. The mechatronics based actuator in the second implementation embodiment is preferably positioned above the weight. In the embodiment that the mechatronics based actuator is in a wire form and both ends thereof are mounted on sidewall of the holder in opposition position to each other, the optical device is configured to have an additional projection that allows the horizontal movement of the wire along the projection in order to achieve a two-axis pendulum motion pattern towards the flame display, as compared to the three-axis cone-shape pendulum motion achieved by the combination of the gyro-levitation structure with the mechatronics based actuator according to the first implementation embodiment of the present invention.

BRIEF DESCRIPTION OF THE DRAWINGS

FIG. 6 is schematic diagrams showing (A) basic principle of using the light guide to guide the light from an LED light source; (B) working model of the LED being inserted into a light guide to form the optical device according to an embodiment of the present invention.

DETAILED DESCRIPTION OF THE INVENTION

Figure 1:
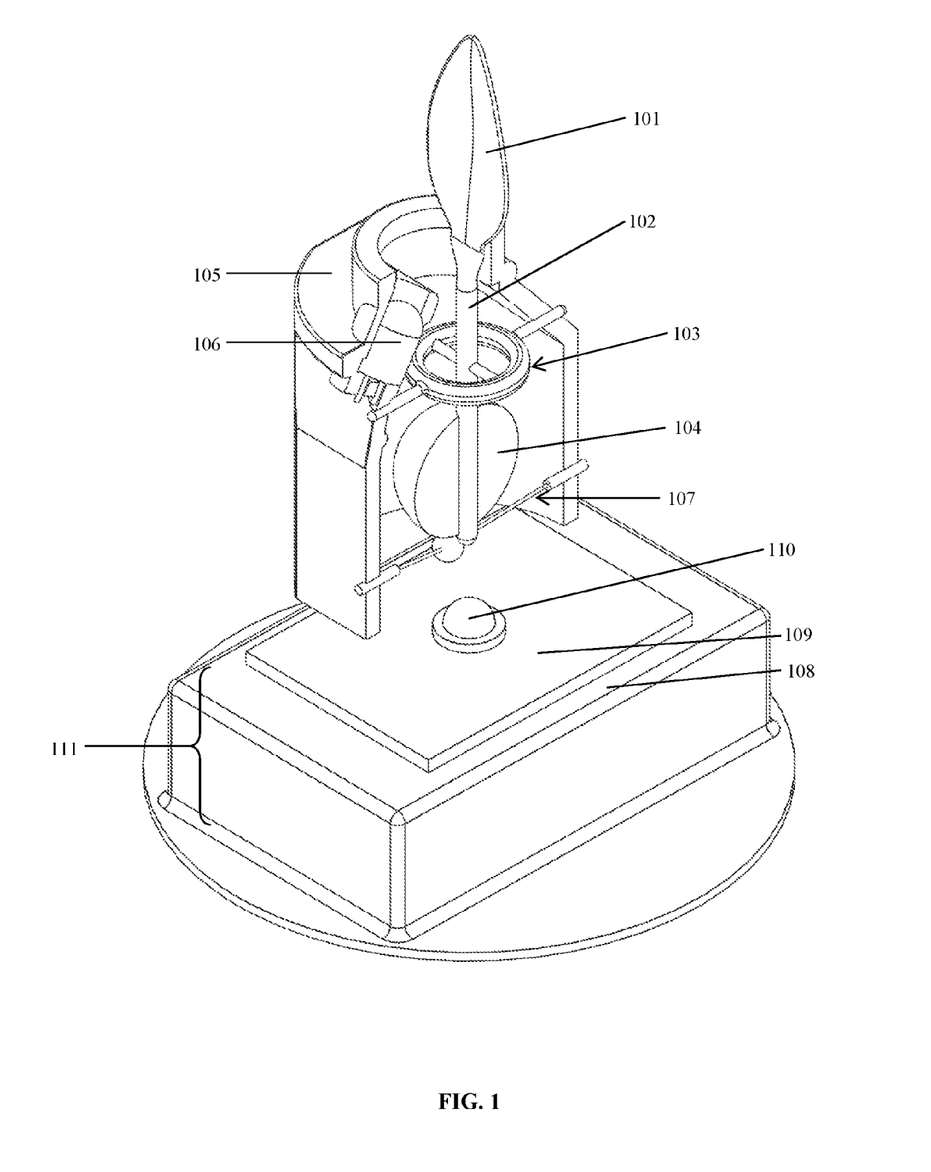
FIG. 1 is a cutaway perspective view of the flameless candle depicting the structure thereof according to the first implementation embodiment of the present invention.

Referring to the first implementation embodiment of the present invention as shown in FIG. 1, the flameless candle system comprises a holder (105) and a base (111). The holder (105) serves as a housing and comprises a flame display (101), an optical device (102), a gyro-levitation unit (103), a weight (104), a first light source (106), and a mechatronics based actuator (107). The base (111) comprises a power source (108), a processor (109) and a second light source (110). One end of the optical device (102) is physically connected to the flame display (101) and another end of the optical device is physically connected with the weight (104). The mechatronics based actuator (107) is positioned below the weight (104) and at a space between the optical device (102) and the second light source (110). The gyro-levitation unit (103) is physically mounted on sidewall of the holder (105) and the optical device (102), respectively, and therefore it acts like a frame to embody the optical device (102). Said gyro-levitation unit (103) comprises an outer gimbal and an inner gimbal which are two spinning wheels with orthogonal axis of rotation. The outer gimbal is mounted on the holder (105) and it assumes a degree of free motion of any orientation. As it also provides a pivotal axis to support the inner gimbal, the two-degree of mutually perpendicular motion so formed is one of the main features of the present invention by which the gyro-levitation unit (103) is geared to drive the flame display (101). In operation, the gyro-levitation unit (103) according to the first implementation embodiment of the present invention enables a cone-shape of solid angle type of pendulum motion which is used to resemble the open candle flame motion by air flow in its surroundings.

Figure 3:
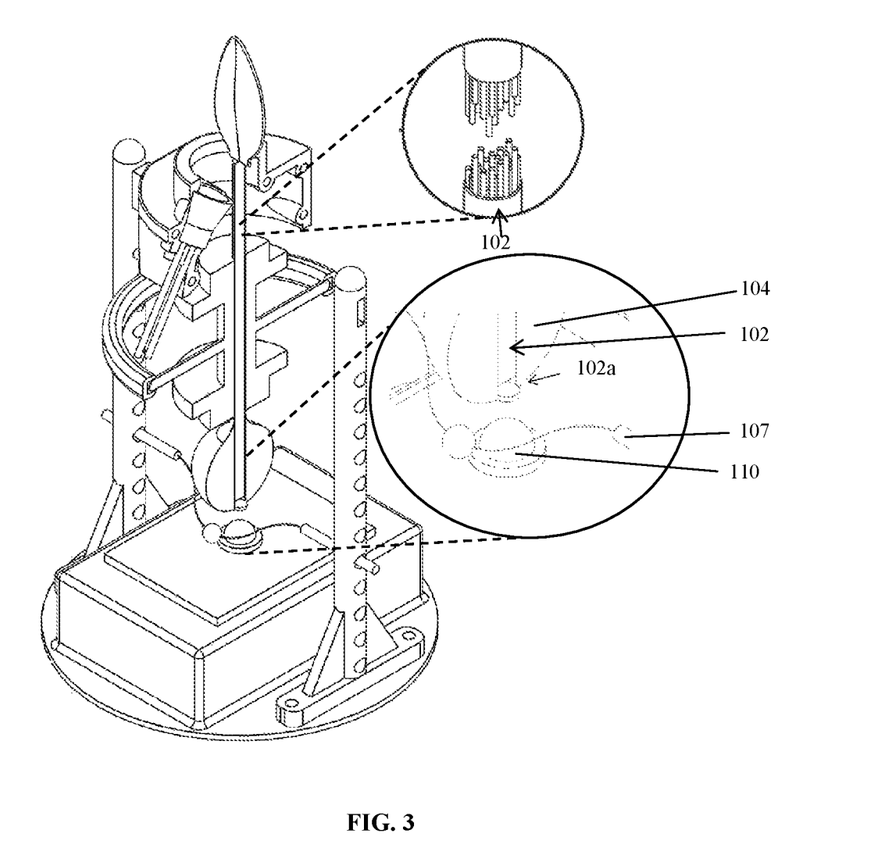
FIG. 3 is another cutaway perspective view of the flameless candle depicting the structure thereof according to the first implementation embodiment of the present invention.
Figure 6A:
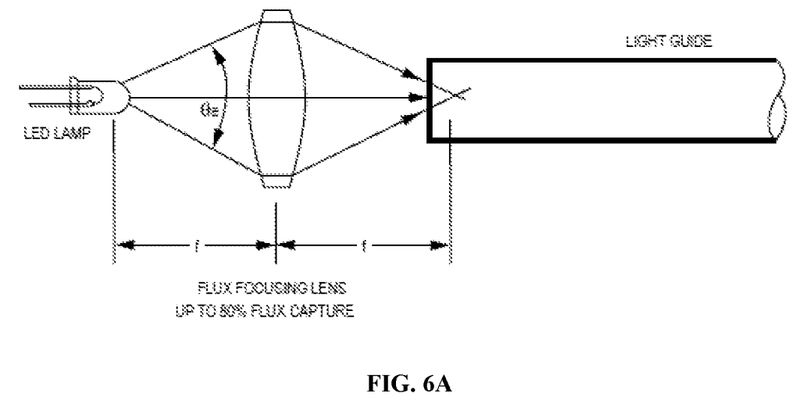
Figure 6B:
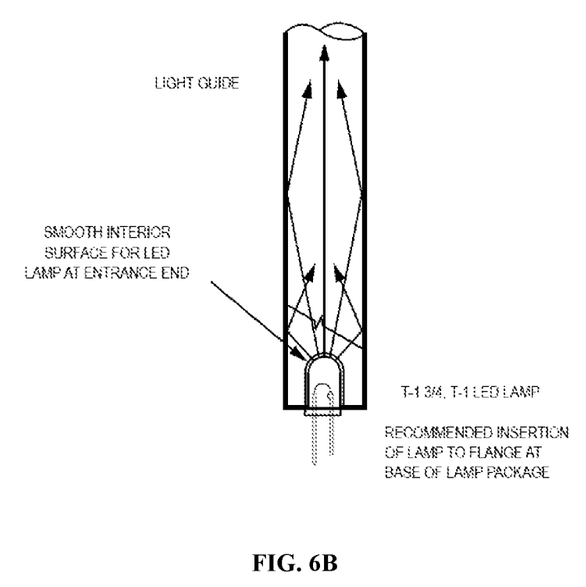

The mechatronics based actuator (107) is another key innovative feature in the present invention. It makes use of the properties of a bi-metal wire such as nickel-titanium alloy, also known as Nitinol, built by making use of combination of crystal structures from the nickel and titanium metals. The explanation for these structural changes lies at the atomic level with its shape changes as a result of the rearrangement of the crystal structures in the solid. It is able to "contract" by approximately 5% when an electric current of about 200 mA is applied and then "expand" to return to its full length again once it is cooled down, or when it is disconnected from the power source. A "to-and-fro" spinning dynamic motion of the actuator (107) initiated by an on-off duty cycle type of electric current can disturb the equilibrium of the gyro-levitation unit (103). This on-off duty cycle type of electric current can be controlled by a dedicated electronic controller. Another innovative feature is to realize the candle flame by using light guide techniques together with the traditional light projection principles. The first light source (106), which is preferably a LED, is digitally controlled by using Pulse Width Modulation (PWM) technique for controlling the brightness of the flame and its flickering effect is created by using synchronized control signal generated in line with the motion control. The second light source (110), which is also preferably a LED, is associated with the optical device (102), which is preferably a light guide, to transport the LED light from the second light source up to the lower part of the flame display (101). FIG. 3 shows an enlarged view of the structure of the light guide (102). At the end where it receives the light from the second light source (110), the light guide (102) comprises a convex lens (102a) for seek of producing a focused light before transmitting the light into the light guide (102). The light guide (102) is made of acrylic resin material and the light transmission effectiveness can be taken care by either keeping a total internal reflection of the light flux (as shown in FIG. 6A) or by coupling the LED source into the light guide (as shown in FIG. 6B). The light from the light source is transmitted through the light guide by means of total internal reflection. Light guides are designed to be made of optical grade materials such as acrylic resin, polycarbonate, epoxies, or other optical lighting materials such as polymethylmethacrylate (PMMA), polystyrene (PS), and Acrylonitrile Butadiene Styrene (ABS).

Figure 2:
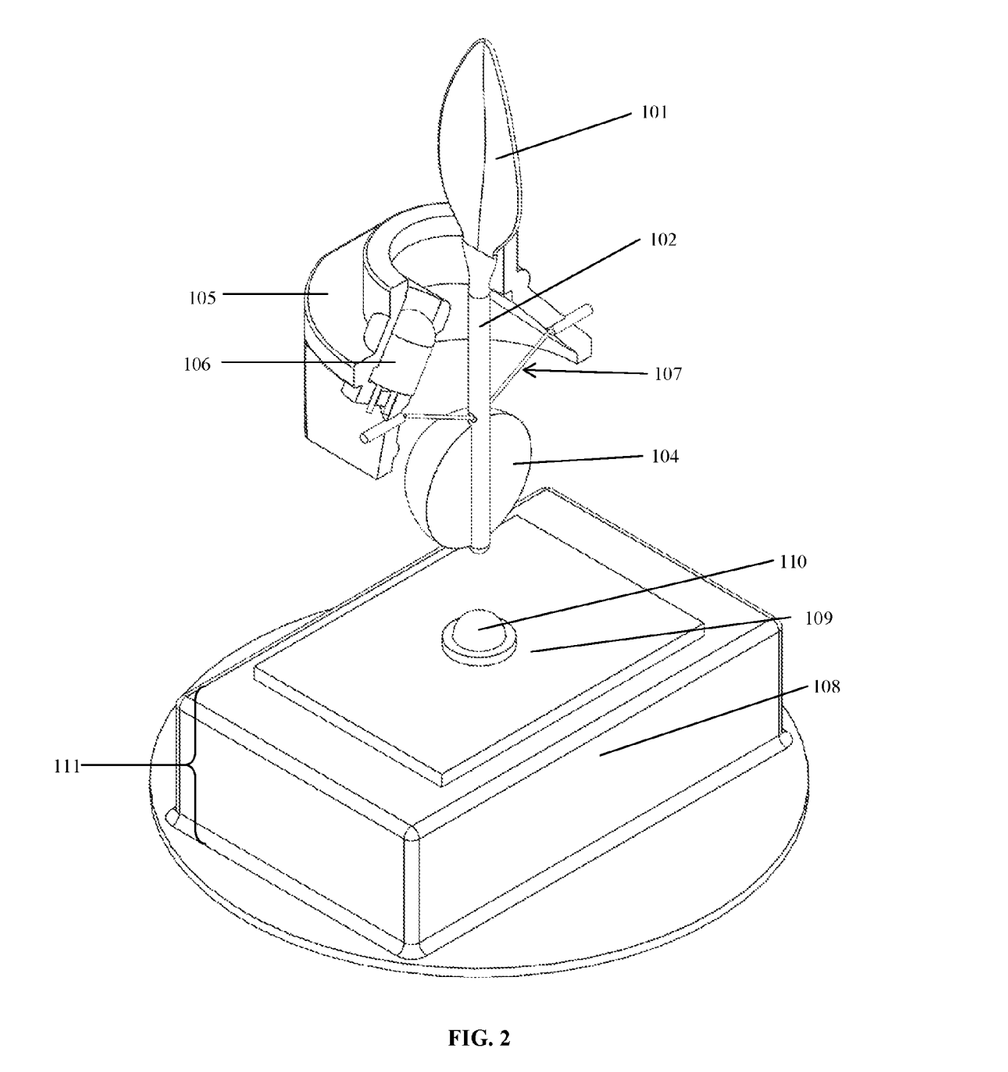
FIG. 2 is a cutaway perspective view of the flameless candle depicting the structure thereof according to the second implementation embodiment of the present invention.
Figure 4:
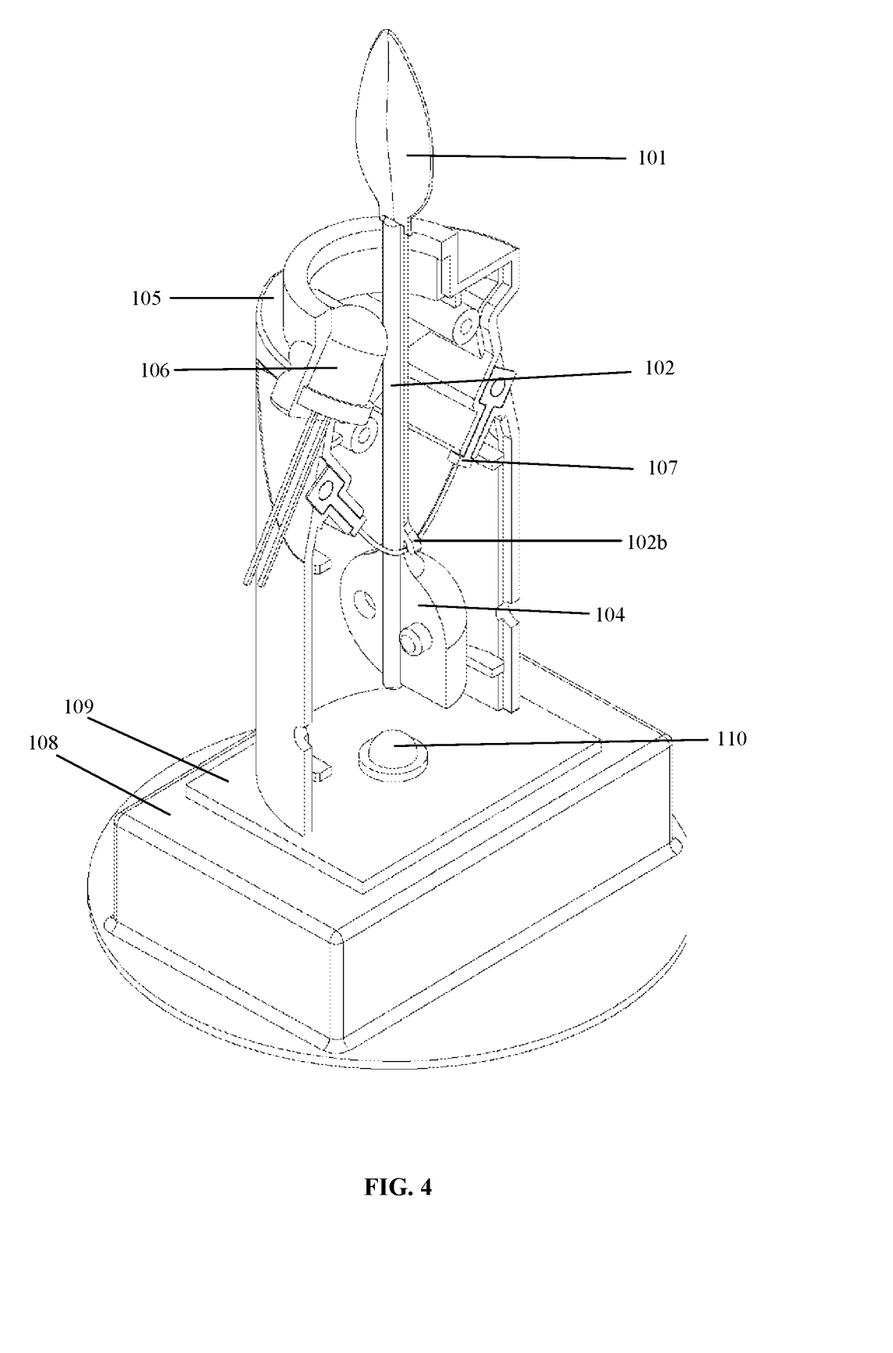
FIG. 4 is another cutaway perspective view of the flameless candle depicting the structure thereof according to the second implementation embodiment of the present invention.

FIG. 2 shows the second implementation embodiment of the present invention, which is a simplified version of the first implementation embodiment, in which a limited two-degree of motion is effected dedicated slackness in the mechatronics based actuating wire (107). The system according to the second implementation embodiment does not comprise said gyro-levitation unit (103) as in the first implementation embodiment. Accordingly, the mechatronics based actuator (107) plays the role of the gyro-levitation unit as in the first implementation embodiment to exert dynamic motion on the flame display but the degree of motion is limited to two-degree because of the configuration. In the second implementation embodiment, both ends of the mechatronics based actuator (107) are mounted at the sidewall of the holder (105) as pivots. As shown in FIG. 4, the optical device (102) is configured to have a projection (102b) which is about the mid-way of the actuator wire (107) in order to allow a horizontal movement of the actuator (107) along the projection (102b) resulting in a two-axis pendulum motion pattern.

Figure 5:
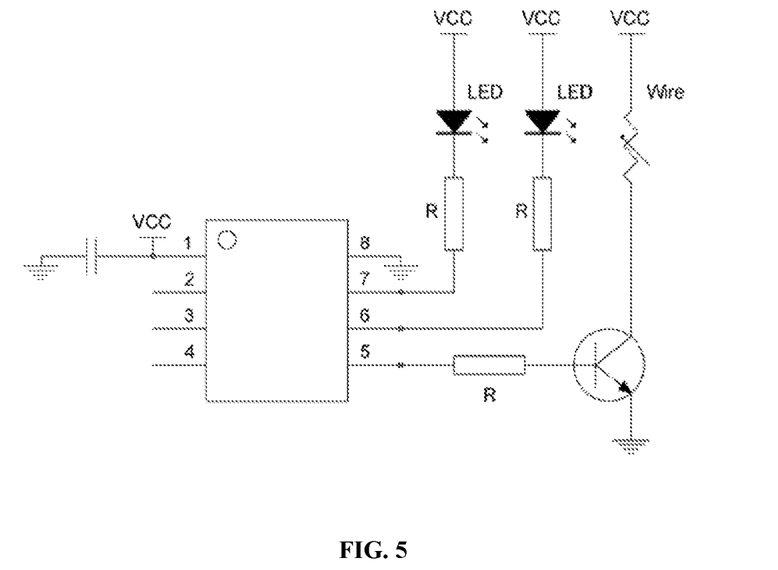
FIG. 5 is a circuit diagram depicting the electronic control unit for the LED light sources according to an embodiment of the present invention.

To control the brightness of the light sources (106, 110) and align the "to-and-fro" dynamic motion of the mechatronics based actuator (107) with the change of brightness of the light sources, the processor (109) comprises an integrated circuit (IC), e.g., an 8-pin IC, with a signal generator for generating a control signal, e.g., a programmable Pulse Width Modulation (PWM) signal, to activate or deactivate the mechatronics based actuator (107) according to a preferred embodiment of the present invention.

FIG. 5 shows a circuit diagram of the 8-pin IC of the processor (109):

Pin 1: for the power source (108), connected with a capacitor as voltage regulator to stabilize the voltage during operation of the device;

Pin 2 to Pin 4: for expandable features of the device;

Pin 5: for providing a programmable PWM signal, which in turn, enables a transistor network to activate/deactivate the alloy wire of the mechatronics based actuator (107) by an on-off duty cycle type of electric current;

Pin 6: for applying a pull-down signal to drive the first light source (106), and connected with a resistor for overcurrent protection;

Pin 7: for applying a pull-down signal to drive the second light source (110), and connected with a resistor for overcurrent protection;

Pin 8: as a common ground to the system.

By the signal generator of the present invention, the amount of brightness of the LED light source and its oscillations are governed based on a Linear Feedback Shift Register (LFSR) which serves to generate the control signal like pseudo-random numbers, pseudo-noise sequences, fast digital counters, and whitening sequences. As the average power delivered is proportional to the modulation duty cycle, the pulse train is designed with a sufficiently high modulation rate and filtered to produce the desired effect of the open candle flame.

While the foregoing invention has been described with respect to various embodiments, such embodiments are not limiting. Numerous variations and modifications would be understood by those of ordinary skill in the art. Such variations and modifications are considered to be included within the scope of the following claims.

What is claimed is:

1. A system for resembling an open candle flame comprising a holder and a base, said holder comprising a gyro-levitation unit, an optical device, a first light source, a flame display, a weight, and a mechatronics based actuator; said base comprising a second light source, a processor and a power source, wherein said gyro-levitation unit comprises at least one outer gimbal mounted on sidewall of the holder and at least one inner gimbal physically mounted with said optical device to enable orthogonal axis of rotation;

one end of said optical device is physically connected with said flame display and another end of said optical device is physically connected with said weight;

said mechatronics based actuator is positioned below said weight and at a space between said optical device and said second light source;

said first light source is mounted at sidewall of the holder providing sideway illumination to said flame display while said second light source is positioned on said base providing upward illumination through said optical device to said flame display such that intensity of a flame image displayed on said flame display is a combination of said illuminations from the first light source and the second light source;

said mechatronics based actuator, said first light source, and said second light source are modulated by Pulse Width Modulation (PWM) signal generated from said processor such that dynamic motion of said mechatronics based actuator aligns with the variation pattern of brightness of the combined illuminations from the first and the second light sources.

2. The system of claim 1, wherein said optical device comprises a light guide and a convex lens for directing illuminations from said second light source to said flame display.

3. The system of claim 1, wherein said mechatronics based actuator is made of a bi-metal material.

4. The system of claim 1, wherein said processor comprises a controlled signal generator for controlling an on-off duty cycle of electric current to generate the PWM signal in order to modulate the mechatronics based actuator, the first light source and the second light source.

5. The system of claim 2, wherein said light guide is made of optical grade material comprising acrylic resin, polycarbonate, epoxies, and/or other optical lighting materials.

6. The system of claim 3, wherein said bi-metal material comprises a nickel-titanium alloy configured in a wire form made by different crystal structures of nickel and titanium.

7. The system of claim 5, wherein said other optical lighting materials comprise polymethylmethacrylate (PMMA), polystyrene (PS), and Acrylonitrile Butadiene Styrene (ABS).

8. The system of claim 6, wherein said mechatronics based actuator exerts an actuating force against said gyro-levitation unit to disturb the equilibrium of the gyro-levitation unit in order to result in a three-axis cone-shape pendulum motion towards the flame display.

* * * * *